Figure 1:
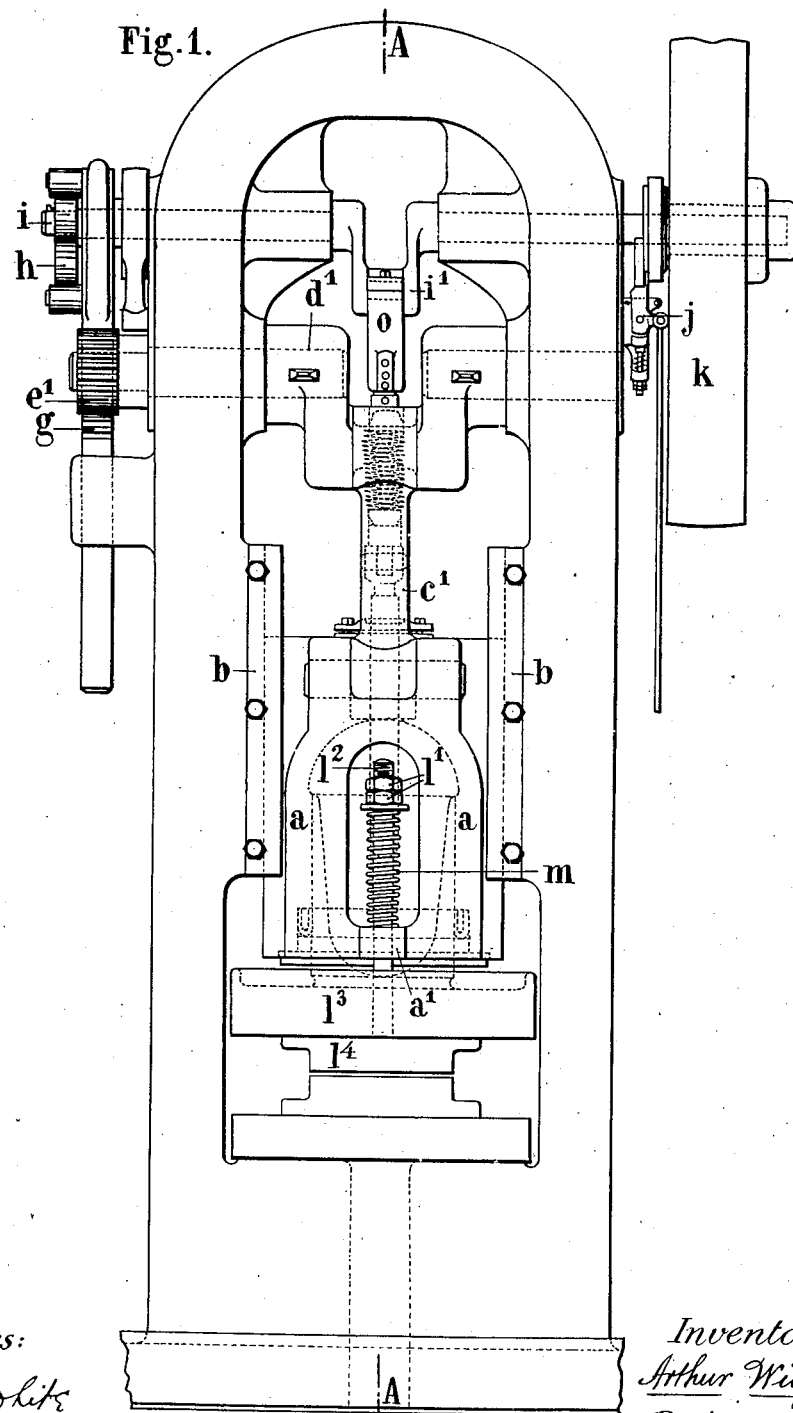

A. WILZIN.
HYDROMECHANICAL PRESS.
APPLICATION FILED APR. 1, 1907.

933,010.

Patented Aug. 31, 1909.
7 SHEETS—SHEET 2.

Witnesses,
Fred White
René Bruine

Inventor:
Arthur Wilzin,
By Attorneys,

A. WILZIN.
HYDROMECHANICAL PRESS.
APPLICATION FILED APR. 1, 1907.
933,010.
Patented Aug. 31, 1909.
7 SHEETS—SHEET 3.
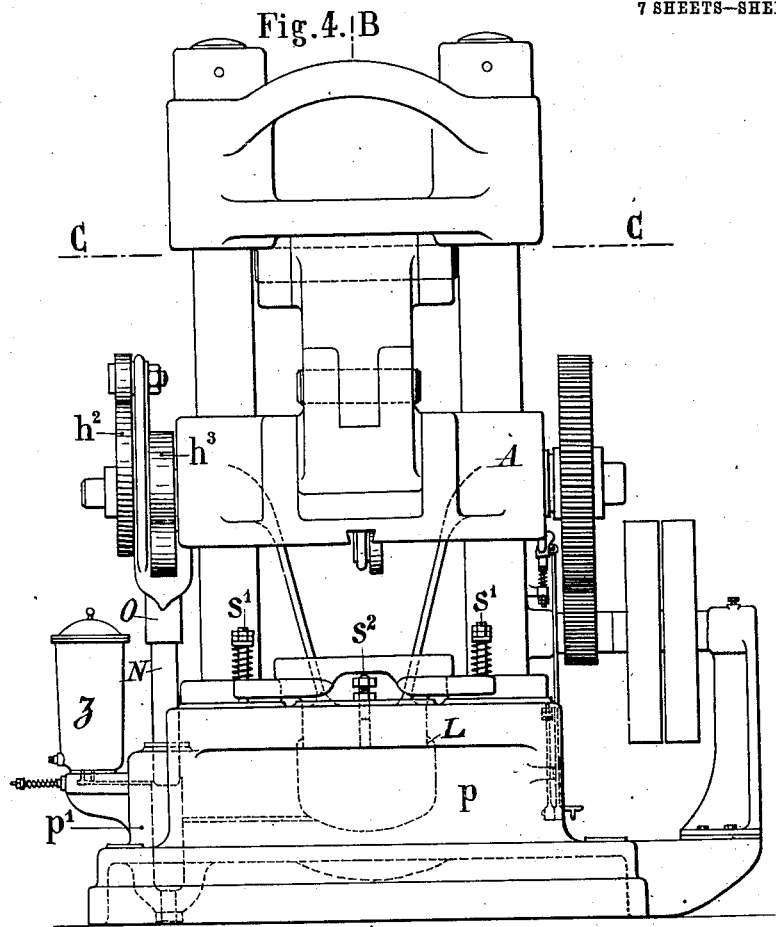
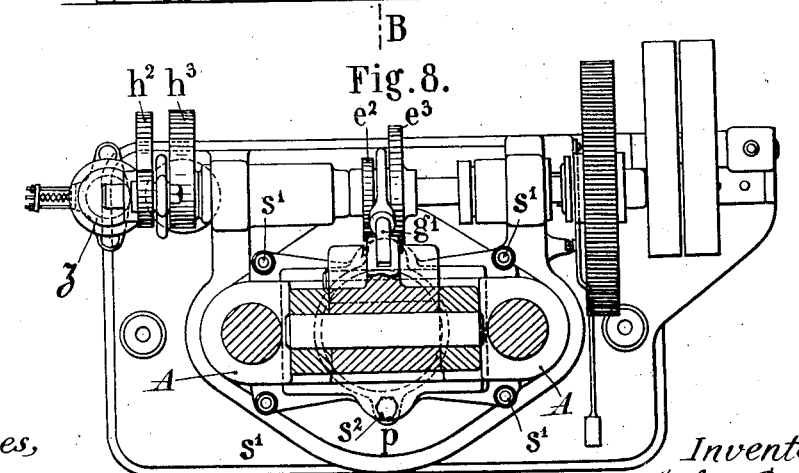

A. WILZIN.
HYDROMECHANICAL PRESS.
APPLICATION FILED APR. 1, 1907.

933,010.

Patented Aug. 31, 1909.
7 SHEETS—SHEET 4.

Witnesses:
Fred White
Rene Bruine

Inventor:
Arthur Wilzin,
By Attorneys,

A. WILZIN.
HYDROMECHANICAL PRESS.
APPLICATION FILED APR. 1, 1907.
933,010.
Patented Aug. 31, 1909.
7 SHEETS—SHEET 5.
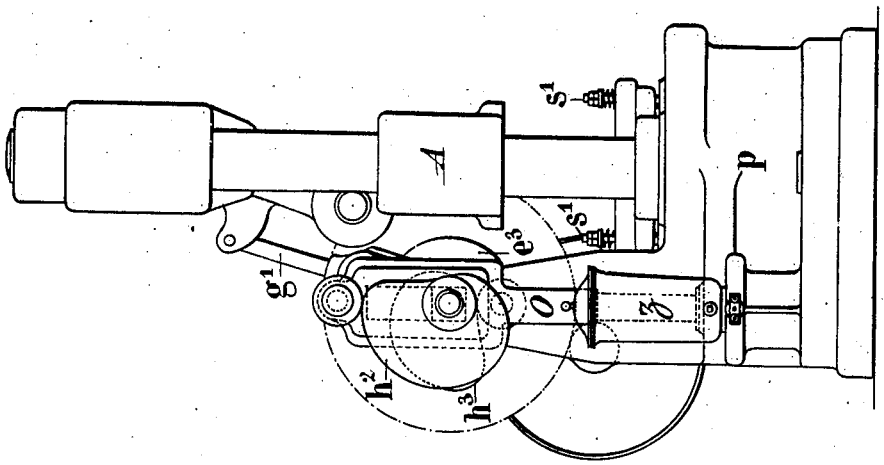
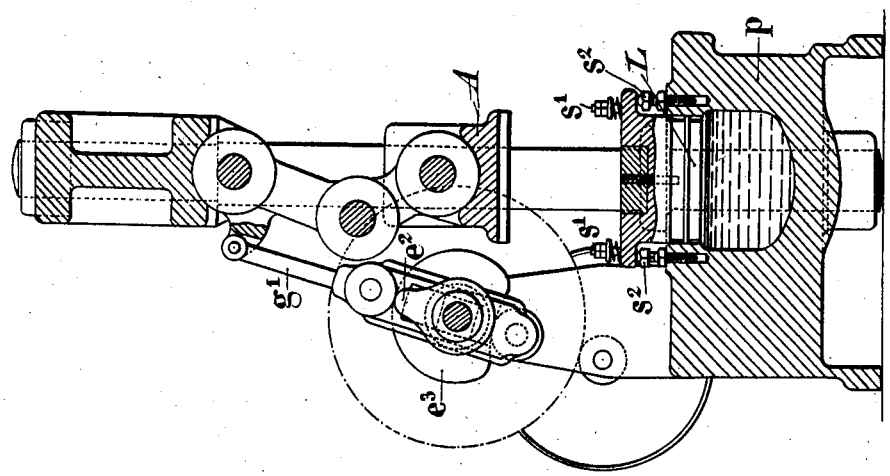
Witnesses:
Fred White
René Muine
Inventor:
Arthur Wilzin,
By Attorneys,

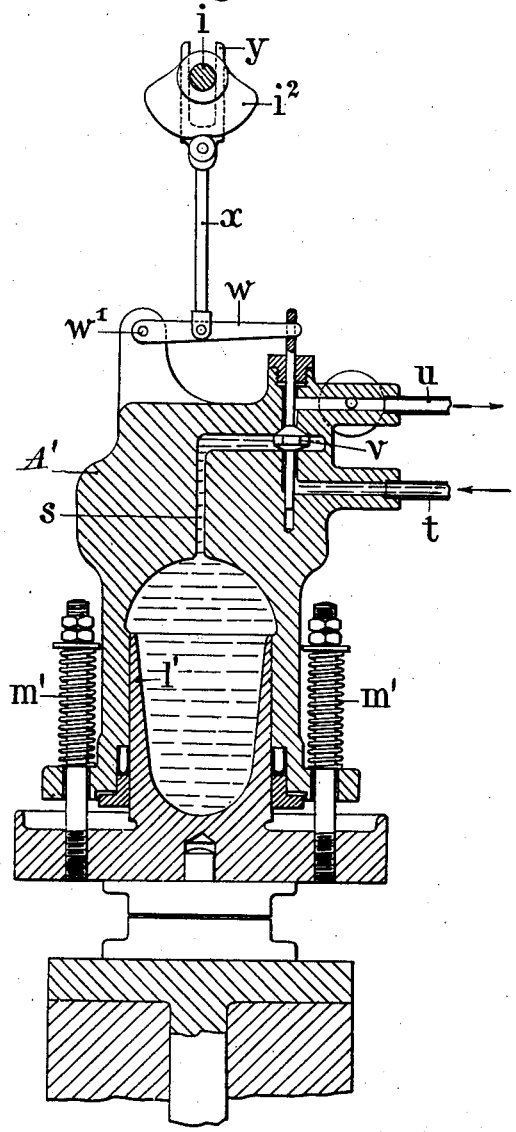

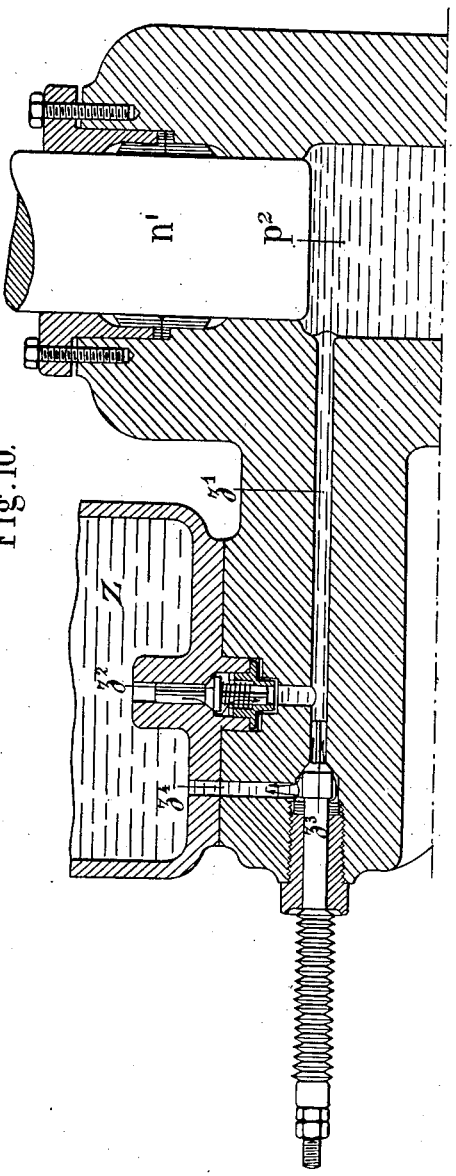

UNITED STATES PATENT OFFICE.

ARTHUR WILZIN, OF CLICHY, FRANCE, ASSIGNOR TO E. W. BLISS CO., OF BROOKLYN, NEW YORK.

HYDROMECHANICAL PRESS.

933,010.

Specification of Letters Patent. Patented Aug. 31, 1909.

Application filed April 1, 1907. Serial No. 365,805.

*To all whom it may concern:*

Be it known that I, ARTHUR WILZIN, of 4 Rue Huntziger, Clichy, Seine, France, engineer, have invented a Hydromechanical Press, of which the following is a full, clear, and exact description.

In power stamping, forging and embossing presses of the usual types, such as crank-, cam- or toggle presses for instance, the strain of the work done by the tools falls on the operating parts (gears, crank-shafts, toggle-links, cams, etc.) while in motion, and as the stroke in these presses is of definite length, these parts as well as the main body are apt to be damaged or even fractured whenever an abnormal resistance is met with, caused for instance by the excessive thickness or hardness of the stock placed between the tools. On the other hand hydraulic presses have been used in cases where differences in the thickness or resistance of the stock to be worked are unavoidable. These presses, owing to the more uniform and less abrupt action of their pressure organs and the way in which the stroke adapts itself to varying thicknesses, give excellent results as regards quality of work produced and suppression of the danger of damaging the tools and the machine, but on the other hand, their action is so excessively slow that few industries could employ them profitably.

The present invention has for its object a hydromechanically operated press that does away with the disadvantages of the two foregoing types, insuring rapid production and embodying nevertheless all the advantages of hydraulic pressure. It is essentially characterized by the combination of: $a$, means for operating mechanically the tool-carrier-slide in such a way as to accomplish very rapidly the longer (idle) portion of the working-stroke, stopping the tool at a very short distance only from the work to be acted on,—with: $b$, means for hydraulically finishing the working stroke, the hydraulic action being automatically started at or about the time of the stoppage of the tool-carrier-slide at the end of its mechanical stroke, thus effecting by hydraulic pressure the really heavy work which usually calls for a very short stroke only, and may therefore be accomplished rapidly.

The accompanying drawing shows by way of example several ways of carrying out the present invention.

Figure 2:
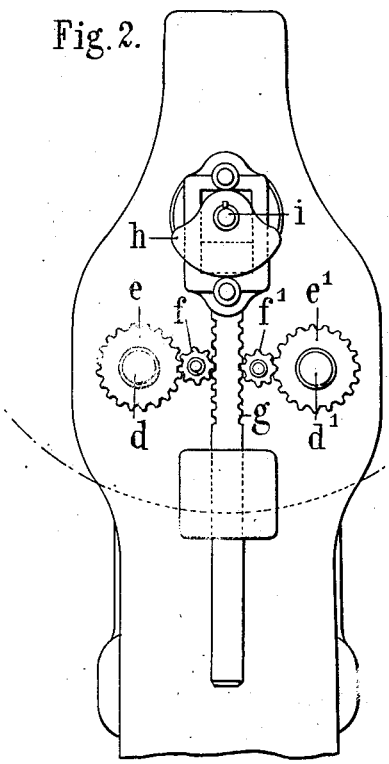
Figure 3:
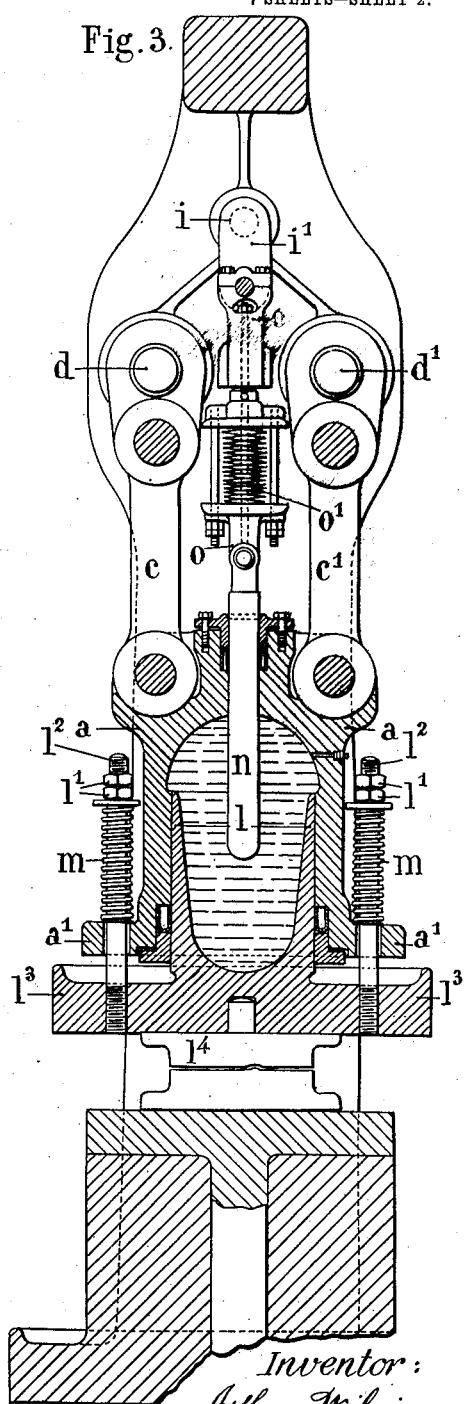
Figure 5:
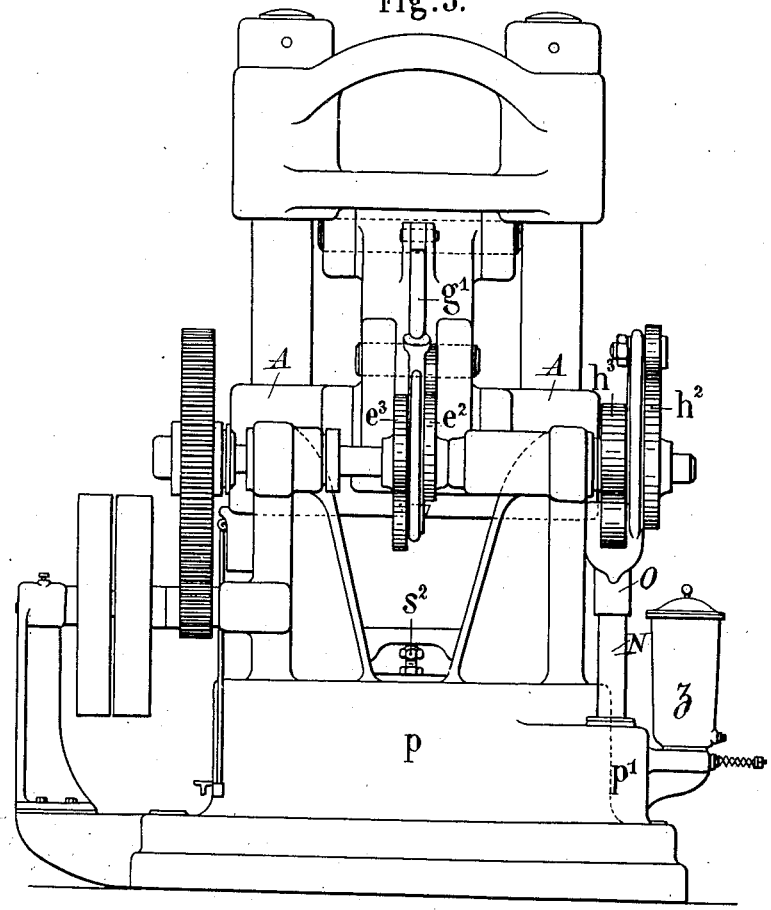

Figures 1 to 3 show a device in which the hydraulic operating means is located in the slide; Fig. 1 is an elevation; Fig. 2 is a side view; Fig. 3 is a vertical section made according to line A—A of Fig. 1. Figs. 4 to 8 show a modification in which the hydraulic operating device is situated in the table of the press; Fig. 4 is a front view; Fig. 5 is a back view; Fig. 6 is a section made according to line B—B of Fig. 4; Fig. 7 is a side view; Fig. 8 is a horizontal section made according to line C—C of Fig. 4. Fig. 9 is a modification of the hydraulic operating means showing in vertical section, a device intended to utilize the energy of an accumulator or of a pump. Fig. 10 shows in vertical section a modification of the hydraulic operating means, including devices adapted to automatically replenish the liquid lost by leakage, and also a safety valve.

The construction shown in Figs. 1 to 3 comprises a slide $a$ movable in the guides $b$ and receiving a reciprocating motion by the following means:—At the upper end of this slide are pivoted the two connecting rods $c$, $c^1$, operated by the two intermediary crank-shafts $d$, $d^1$; the latter carry each at one of its ends a gear wheel $e$, $e^1$, in mesh through intermediate pinions $f$, $f^1$ with double rack $g$ which receives reciprocating motion from a cam $h$ keyed upon the driving shaft $i$. Clutch $j$ permits of connecting or disconnecting shaft $i$ with the fly-wheel $k$. Slide $a$ is bored out to form a cylinder, in which is fitted a large piston $l$ supported by springs $m$ interposed between lugs $a^1$ of the slide $a$ and nuts $l^1$ on the rods $l^2$, carried by the flange $l^3$ of piston $l$ and passing freely through lugs $a^1$. The lower face of piston $l$ forms the punch holder for the punch or tool $l^4$.

Into the bore of slide $a$, which is entirely filled with liquid, projects plunger $n$ which receives reciprocating motion from connecting-rod $o$ operated by crank $i^1$ of driving shaft $i$. The connecting-rod $o$ may be composed, as shown in the drawing, of two parts connected together by a spring $o^1$, acting as a pressure limiting device.

The operation of this press is as follows:—Supposing the slide $a$ to be at the top of its stroke and the driving shaft $i$ starting on its motion, then cam $h$ will impart to rack $g$ a downward motion, which the latter transmits through the pinions $f$, $f^1$ and toothed-wheels $e$, $e^1$, thus causing an angular displacement of the two intermediate shafts $d$, $d^1$ which communicate through the toggle-levers $c$, $c^1$ a downward displacement to the slide $a$ and consequently to the piston $l$ held in the latter. In this way the punch is quickly brought down very close to the work to be acted upon, without any jar or strain, as the slide is stopped before the tool touches the work. The cranks of the two shafts $d$, $d^1$ form with the levers $c$, $c^1$ connected thereto toggle-joints which in their straightened position (shown in Fig. 3) are adapted to transmit directly to the frame of the press, without the intervention of any moving parts, such pressure as is subsequently brought to bear against them by the action of the tool. The circular part of the cam maintains these toggle-joints and consequently the slide $a$ for a certain time in stationary position at the bottom of the stroke. During this time, the plunger $n$, actuated by the shaft $i$, is forced into the liquid filling the chamber between piston $l$ and slide $a$. Piston $l$ under the action of the pressure thus transmitted to the liquid and which is increased in the ratio of the diameter of piston $l$ to piston $n$, is forced down, carrying the punch against the work placed on the die, and thus accomplishing the stamping, embossing or forging by hydraulic pressure.

After the tool has performed its work, plunger $n$ rises, while slide $a$ is still at a standstill, thus allowing springs $m$ (which had been compressed while forcing out piston $l$) to push back into the slide $a$ the piston $l$, relieving the punch from contact with the pressed work. At this moment cam $h$ lifts the rack $g$ which through pinions $e$, $e^1$ and $f$, $f^1$ causes an angular displacement of shafts $d$, $d^1$, thus breaking the straight line position of the toggle-levers $c$, $c^1$ and quickly raising the slide to its highest point. The tools being now far apart, the stamped piece may be readily removed and another one placed, ready for the next working stroke, which is caused by depressing the lever which acts upon clutch $j$.

Figs. 4 to 8 show a modification in which the hydraulic operating device is located in the table $p$ of the press.

The mechanical operation of the slide A is effected here through the cams $e^2$ and $e^3$, acting through the medium of the rod $g^1$ upon the upper member of the toggle-lever.

The hydraulic operation is effected as follows:—The table $p$ of the press is bored out so as to form a cylinder for the large piston L to move up and down in. The upper face of this piston L forms the die bed. A second cylinder $p^1$ of smaller diameter is bored out in a lateral projection of table $p$ and communicates with the large cylinder. Into this second cylinder $p^1$ projects a plunger N acted on by the cams $h^2$, $h^3$ through the connecting rod O. Four springs surrounding the screw studs $s^1$ fastened in the table force the plunger L down against the adjusting screws $s^2$. The operation is similar to that of the foregoing press.

When the cam-actuated toggle-slide has brought the tool down close to the work to be acted upon, the plunger N is forced into the small cylinder $p^1$; the large piston L is thereby raised under the pressure transmitted by the fluid and the tool it carries exerts its action upon the piece to be worked, which is pressed on its other face against the punch fastened on the bottom of slide A, which at the time is in its lowest position and at a standstill. After the work is done, plunger N rises, the springs around studs $s^1$ push back the plunger L until it meets the buttscrews $s^2$, thus relieving the stamped piece from pressure and slide A is then rapidly raised to its highest position by the action of cams $e^2$ and $e^3$.

An accumulator or a pressure pump may be used instead of the plunger N in connection with hydromechanical presses of my invention.

Fig. 9 shows the application of this modification, in the case where the hydraulic operating device is located in the slide.

Into the cylinder of the pump formed by the slide $A^1$ opens a conduit $s$, connected at its other end with two conduits $t$, $u$, the one of which $t$ is connected with the accumulator, and supplies the water under pressure, while the other $u$ constitutes the exhaust pipe. A double-acting valve $v$ is interposed between the two points where these conduits $t$, $u$ join the main conduit $s$. The stem of the valve $v$ is connected with the end of a lever $w$, pivoted on stud $w^1$ and actuated through rod $x$ by the cam $i^2$ on shaft $i$.

The operation is as follows:—While the mechanical operating device carries down the slide $A^1$, the valve $v$ closes the conduit $t$, so as to interrupt any communication between the pump-cylinder in slide $A^1$ and the accumulator or pressure pump. When the slide $A^1$ has reached the bottom of its stroke, the cam $i^2$ raises valve $v$ so as to close the exhaust and allow the admission into the cylinder of the water under pressure supplied from the accumulator or pump. Under this pressure piston $l^1$ (corresponding to $l$, Fig. 3) is forced down and with it the punch, thus stamping the work placed on the die. When the work is completed, the cam $l^2$ lowers the valve $v$, so as to close the admission and open the exhaust; the piston $l^1$ is pulled up by its springs $m^1$, reassumes its initial position in the slide and the water forced back by the piston escapes through the conduit $u$. A similar device may be used in case of the hydraulic operating device being located in the table of the press.

Fig. 10 shows a device adapted to replenish the liquid lost by leakage and also a safety valve to limit the pressure as may be required.

The replenishing tank Z is filled with liquid and communicates with the small pressure cylinder $p^2$ by conduit $z^1$. As soon as a partial void is occasioned by leakage beneath $n^1$, the pressure of the column of liquid in Z acting against the very light spring which holds up valve $z^2$, forces this valve down and causes a complete filling up of cylinder $p^2$. A similar replenishing apparatus may be applied to presses having the hydraulic pressure device in the slide (as per Figs. 1 and 3) instead of the table. This replenishing device in connection with the safety device renders it possible to insure the requisite degree of uniform pressure, even in the case of leaky joints and varying thicknesses, for which purpose it will only be necessary to so adjust the screws $s^2$, as a starting point for the plunger to rise from, that the die which it carries will have a tendency to move somewhat beyond the point which the work or the tools call for. As soon as the rising lower tool encounters the positive resistance of the punch or the work and the pressure thus engendered in conduit $z^1$ rises beyond what safety valve $z^3$ is set for, this valve will open, letting the surplus liquid escape through canal $z^4$ into tank Z. The partial void thus occasioned in cylinder $p^2$ upon the return stroke of plunger $n^1$ is promptly replenished by the valve $z^2$ opening under the pressure of the column of liquid in Z. In this manner an excessive length of stroke may be utilized every time to be sure of carrying the pressure down home in spite of leakage and notwithstanding deficiencies in bulk or thickness of the piece interposed between the tools.

I do not limit my invention to the described means of operating the tool carrier slide or hydraulic plungers, but declare the nature of my invention to be determined by the following claims:

Claims.

1. In a machine of the class described, in combination, a tool carrier, mechanical devices for rapidly bringing the same to a point very close to but not touching the work, and maintaining the same rigidly at rest at that point, and a hydraulic device for effecting the working pressure upon the work during the stand-still of the carrier.

2. In a machine of the class described, in combination, a tool carrier, mechanical devices for rapidly bringing the same to a point very close to but not touching the work, and maintaining the same rigidly at rest at that point, and a hydraulic device for effecting the working pressure upon the work during the stand-still of the carrier, said devices being arranged to first relieve the work from hydraulic pressure and then to open up the space mechanically.

3. In a machine of the class described, in combination, a tool carrier, toggle mechanism for rapidly moving said carrier to bring the tool very close to but not touching the work, the toggles being straightened out and at rest at such point, so as to transmit any pressure on the tool directly to the main body of the press, and a hydraulic device for effecting the working pressure upon the work during this stand-still of the carrier.

4. In a machine of the class described, in combination, a tool carrier, mechanical devices for rapidly bringing the same to a point very close to but not touching the work, and maintaining the same rigidly at rest at that point, and a hydraulic device for effecting the working pressure upon the work during the stand-still of the carrier, said mechanical devices being applied to one of the tools, and said hydraulic device to the other tool.

5. In a machine of the class described, in combination, an upper tool carrier, toggle mechanism for moving said carrier rapidly to a point very close to but not touching the work, at which point the toggles are straightened out and at rest, and a hydraulic cylinder and piston serving to operate the lower tool to effect the working pressure upon the work during the stand-still of the upper tool.

6. In a machine of the class described, in combination, a hydraulic device for effecting the working pressure and including a pressure plunger, a replenishing tank communicating with the chamber into which the pressure plunger projects, a valve arranged to admit liquid from the replenishing tank to said chamber whenever there is a partial void therein, and a valve allowing liquid to escape from said chamber to said replenishing tank whenever the tool encounters a resistance greater than that which is called for by the work to be accomplished.

7. In a machine of the class described, in combination, a hydraulic device for effecting the working pressure and including a pressure plunger, a replenishing tank communicating with the chamber into which the pressure plunger projects, a valve arranged to admit liquid from the replenishing tank to said chamber whenever there is a partial void therein, and a valve allowing liquid to escape from said chamber to said replenishing tank whenever the tool encounters a resistance greater than that which is called for by the work to be accomplished, said plunger being arranged to have a determined stroke in excess of that necessary to effect the working movement of the tool, so as to expel liquid from said chamber into the replenishing tank and to return liquid from the replenishing tank to said chamber at each operation, so as to insure always a sufficient quantity of liquid in the chamber.

The foregoing specification of my "press with hydromechanic device" signed by me this nineteenth day of March 1907.

ARTHUR WILZIN.

Witnesses:
HANSON C. COXE,
MAURICE H. PIGNET.